W. J. Hallefass,
Governor

N° 54,336.   Patented May 1, 1866.

Witnesses:   Inventor:

UNITED STATES PATENT OFFICE.

WILLIAM J. HALLEFAS, BROOKLYN, NEW YORK.

IMPROVEMENT IN ENGINE-GOVERNORS.

Specification forming part of Letters Patent No. 54,336, dated May 1, 1866.

*To all whom it may concern:*

Be it known that I, WILLIAM J. HALLEFAS, of Brooklyn, in the county of Kings and State of New York, have invented a new and Improved Mode of Operating Governor-Valves; and I do hereby declare that the following is a full, clear, and exact description thereof, which will enable those skilled in the art to make and use the same, reference being had to the accompanying drawings, forming a part of this specification, in which—

Figure 2:
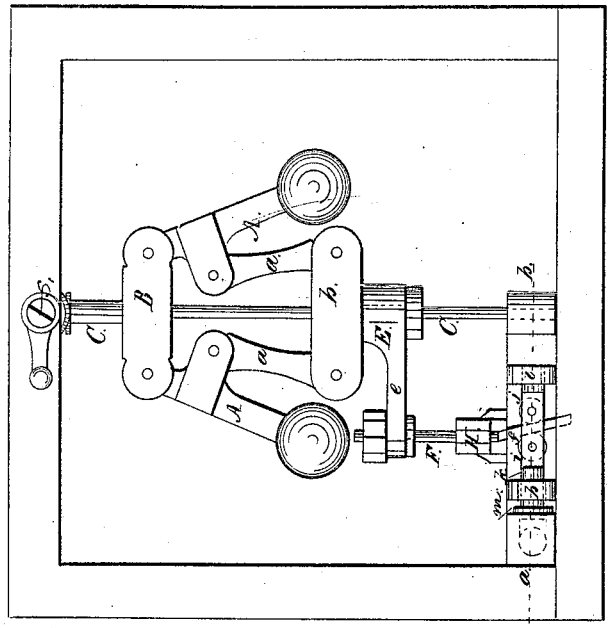
Figure 3:
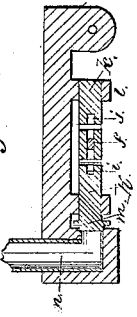
Figure 1:
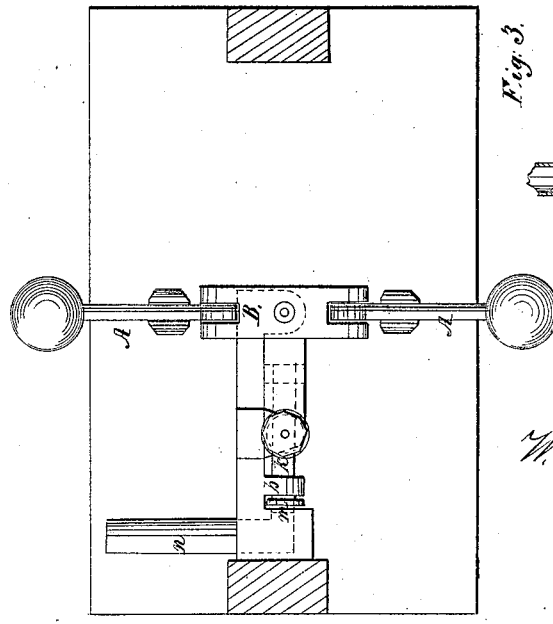

Figure 1 is a top view of my improved governing apparatus, and Fig. 2 is a side elevation of the same. Fig. 3 is a horizontal section, taken in the plane of the line $a\,b$ in Fig. 2.

Similar letters of reference in the different figures indicate corresponding parts.

This invention relates to new and useful improvements in the appliances or agencies for operating the governor-valve of engines generally, but is designed more especially for regulating the supply of air in air-engines, and is connected with a valve and pipe having communication with the air-supply pump in such manner that when the speed of the engine increases above a given velocity the regulating or governor valve is opened and sufficient air allowed to escape from the feed-pump to confine the movements of the engine to the desired maximum velocity.

My invention consists in combining with a centrifugal governor, a double inclined plane, which moves vertically between a pair of anti-friction rollers attached to the valve-stem in such a manner that a very simple and sensitive movement is obtained for operating the escape or governing valve, as hereinafter fully set forth.

Having described the nature of my invention, I will proceed to describe its construction and operation.

The governor-arms A A, Fig. 2, in the accompanying drawings, are attached to the cross-head B, which is fixed on the spindle C, and the secondary arms or connecting-links $a\,a$ are pivoted to a second cross-head, $b$, which slides vertically on the spindle and carries the collar E and arms $e$.

To the outer end of arm $e$ is rigidly secured a vertical rod, F, the lower end of which passes through a guide, H, and terminates with a portion, $f$, which is deflected or bent out of line with the outer part, F, and which, to all intents and purposes, is a double inclined plane.

The deflected portion $f$ of the rod F $f$ passes down between two anti-friction rollers, $i$ and $j$, which are pivoted in the valve-stem $k$. The valve-stem $k$ moves in guides $l\,l$.

$m$ is the escape-valve, and closes the end of an escape-pipe, $n$, Fig. 3, which communicates with the air-pump.

The spindle C is geared to or may be belted to the driving-shaft S.

Its operation is as follows: When the motion of the engine is increased sufficiently to elevate the cross-head and arm $b\,e$, then the double inclined plane $f$ is raised vertically and the roller $j$ is acted upon by the said inclined plane, and the escape-valve $m$ is opened and air allowed to escape from the feeding apparatus of the engine; but as soon as the governor begins to fall the rod F descends, and the opposite inclined surface of $f$ acts upon the roller $i$ to close the valve. By these means a governing movement is obtained which acts with promptness and efficiency.

Having thus described my invention, what I claim as new, and desire to secure by Letters Patent, is—

The governor A A, when in combination with the inclined planes $f$, anti-friction rollers $i\,j$, and a valve-stem, $k$, arranged and operating substantially in the manner and for the purpose set forth.

WILLIAM T. HALLEFAS.

Witnesses:
 A. NEILL.
 WM. K. SMITH.